United States Patent
Kitson et al.

(10) Patent No.: US 8,817,374 B2
(45) Date of Patent: Aug. 26, 2014

(54) BIREFRINGENT DIFFUSER

(75) Inventors: Stephen Kitson, Bristol (GB); Adrian Geisow, Portishead (GB); Christopher Newton, Weston-Super-Mare (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 13/387,153

(22) PCT Filed: Dec. 18, 2009

(86) PCT No.: PCT/US2009/068833
§ 371 (c)(1),
(2), (4) Date: Jan. 26, 2012

(87) PCT Pub. No.: WO2011/075148
PCT Pub. Date: Jun. 23, 2011

(65) Prior Publication Data
US 2012/0120489 A1    May 17, 2012

(51) Int. Cl.
*G02B 5/02*    (2006.01)
*G02B 5/30*    (2006.01)
*G02B 27/00*   (2006.01)

(52) U.S. Cl.
CPC .......... *G02B 5/0242* (2013.01); *G02B 27/0018* (2013.01); *G02B 5/3083* (2013.01); *G02B 5/0263* (2013.01)
USPC .............. 359/489.01; 359/489.06; 349/96

(58) Field of Classification Search
CPC ............. G02B 5/0242; G02B 27/0018; G02B 5/3083; G02B 5/0263
USPC .......................... 359/489.01, 489.06, 489.15; 349/96–98, 112, 113
See application file for complete search history.

(56) References Cited

U.S. PATENT DOCUMENTS

| 6,075,581 | A  | * | 6/2000  | Shirochi ............... 349/112 |
| 6,965,717 | B1 | * | 11/2005 | Tabuchi ................ 385/37 |
| 7,223,452 | B2 | * | 5/2007  | Murakami et al. ...... 428/1.3 |
| 7,492,517 | B2 | * | 2/2009  | McGrew ............. 359/489.01 |
| 2003/0117707 | A1 | | 6/2003 | Uchida et al. |
| 2004/0105617 | A1 | | 6/2004 | Cornelissen et al. |
| 2008/0055881 | A1 | | 3/2008 | O'Neill et al. |

FOREIGN PATENT DOCUMENTS

WO    WO-2008062188    5/2008

OTHER PUBLICATIONS

International Search Report and Written Opinion mailed on Aug. 26, 2010 for International Application No. PCT/US2009/068833 filed on Dec. 18, 2009; 10 pages.
Supplementary EP Search report; Dated Mar. 22, 2013; issued in related EP application 09852405.1.
Ruffieux, Patrick et al; "Polarization sensitive diffuser"; 2008; Proc. of SPIE; vol. 6992.

* cited by examiner

*Primary Examiner* — Frank Font

(57) ABSTRACT

A birefringent diffuser includes a first optical material and a first birefringent material. The first optical material and the first birefringent material are combined to form a planar layer. The planar layer has an internal pattern of the materials presenting a substantially uniform index of refraction for incident light which is substantially normal to the planar layer and exhibiting a varying index of refraction for at least a portion of light which is trapped in guided modes.

20 Claims, 8 Drawing Sheets

BIREFRINGENT DIFFUSER

RELATED APPLICATIONS

This application claims priority under 35 U.S.C. 371 to PCT/US2009/068833, entitled "Birefringent Diffuser", filed on Dec. 18, 2009, commonly assigned herewith, and hereby incorporated by reference.

BACKGROUND

When light passes from air into a transparent medium such as plastic or glass, it can become trapped within the transparent medium. In some circumstances this can be undesirable. For example, in reflective displays, light that is trapped within the transparent medium is not visible to the user and results in a decreased brightness of the reflective display.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
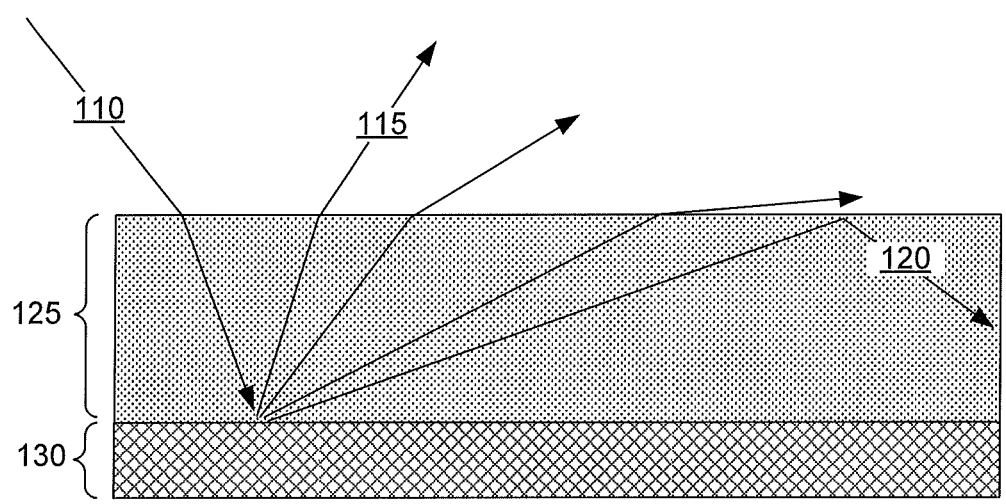
FIG. 1 is a cross sectional diagram of light which is scattered within a first optical material, according to one embodiment of principles described herein.

In order to produce a wide viewing angle and a bright image, displays include a diffusing element to spread light over a range of directions. This is particularly relevant for reflective displays where light must be used as efficiently as possible. However, the use of a diffusing element can result in some light being scattered within the display at angles beyond the total internal reflection limit. The light is then trapped within the display and does significantly not contribute to the image viewed by the user.

Although some of the trapped light may get scattered out of the display as a result of further interactions with the diffusing element or a reflector, some of the trapped light will get absorbed or remain trapped, resulting in a loss in brightness. This loss can be limited to a certain extent by using a diffuse reflector with a narrower scatter angle, but this restricts the viewing angle. One approach to solving this problem is to include some structure to scatter any light trapped within the display back out again. For instance, a grating with a pitch that closely matches the wavelength of light will scatter the light back at angles below the total internal reflection limit. The problem is that this process is reversible - light incident at near normal incidence can be scattered into trapped modes in the display by the grating. Ideally, a structure would be included in the reflective display that directs trapped light out of the display much more strongly than it scatters incident light into the trapped modes.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the specification and appended claims, the term "total internal reflection" refers to the reflection of light at a medium boundary. Total internal reflection at a medium boundary occurs when the light travels through a higher index of refraction material and is incident on a medium boundary between the higher index medium and a lower index medium. For incidence angles which are larger than a critical angle, all of the light is reflected from the boundary back into the higher index medium.

A guided mode refers to light whose travel is constrained and directed through a medium. A common example of a guided mode is light which is trapped within a medium by total internal reflection. Light which is trapped within a medium by total internal reflection is called "guided light" or "trapped light."

Liquid crystals are a state of matter which has some of the properties of both a conventional liquid and a solid crystal. For example, the liquid crystals may flow like a liquid but maintain long range of molecular order reminiscent of a solid crystal.

As used in the specification and appended claims, the term "birefringent" or "birefringent material" refers to materials which have an index of refraction which differs for incident electromagnetic waves with different polarizations. The birefringent properties of a material may also be orientation specific. In general, birefringent material is has an ordinary axis and an extra-ordinary axis. The optical properties of the material, including the index of refraction vary between the ordinary axis and the extra-ordinary axis. Consequently, the interaction of incident light with a birefringent material may be dependent both on the polarization of the light and the incident angle of the light. Some species of liquid crystals are birefringent.

As used in the specification and appended claims the term "diffuser" refers to a micro structure of oriented elements which splits and diffracts light based on the spacing of the diffuser elements and the wavelength of the light.

FIG. 1 is a diagram of an incident light ray (110) which is scattered within a first optical material (125). In this illustrative embodiment, the incident light ray (110) travels through a lower index medium, such as air, before encountering the first optical material (125) which has a higher index of refraction. The incident light ray (110) is refracted at the interface between the air and the first optical material (125) due to the difference in index of refraction of the two materials. As used in the specification, refraction refers to a change in direction of an optical beam due to a change in its velocity as it transitions into a second medium. This change in direction occurs according to Snell's law.

The incident light (110) passes through the first optical material (125) and strikes the upper surface of a diffuse reflector (130). This upper surface has an uneven or granular surface such that the light (110) is reflected into a number of reflected beams (115) which have a range of angles. This diffuse property of the reflector can be advantageous in a reflective display because it increases the viewing angle from which a user can perceive the displayed image. However, the diffuse reflector may reflect some of the light at large angles. This light (120) is incident on the interface between the first optical material (125) and the air at relatively high incident angles and experiences total internal reflection. This light (120) is then trapped within the first optical material (125) and is lost to the viewer. This results in a loss of display brightness.

Figure 2:
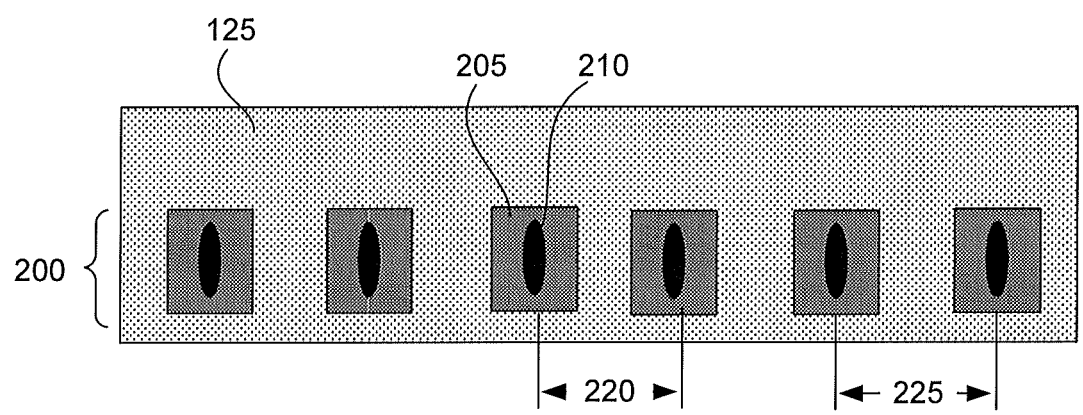
FIG. 2 is a cross sectional diagram of an illustrative birefringent diffuser, according to one illustrative embodiment of principles described herein.

According to one illustrative embodiment, a birefringent microstructure is used to strongly scatter guided light, but not scatter incident light into guided modes. FIGS. 2-4 illustrate the birefringent diffuser operation. For simplicity, the diffusers are shown as having a regular structure, whereas in practice the diffusers may have a randomized pitch to ensure a diffuse appearance. The pitches of elements within the diffuser can be within a range which covers the wavelength of the target light in air to the wavelength of the target light in the medium. This pitch will ensure that guided light will tend to be scattered at an angle that will escape beyond total internal reflection.

FIG. 2 is a diagram of a birefringent diffuser (200) which can be configured to recover a portion of the light which is trapped in a first optical material (125). According to one illustrative embodiment, the birefringent diffuser (200) includes a microstructure which is made from a first birefringent material. The first birefringent material is formed into a number of birefringent polymer elements (205). For example, the birefringent polymer elements (205) can be made by polymerizing mesogenic molecules which have a generally rigid and rod-like geometry. The birefringent polymer elements (205) are generally aligned so that their ordinary optical axes are aligned perpendicularly with respect to the upper surface of the matrix. In the case of reactive mesogens, this can be achieved by homeotropically aligning the mesogenic material prior to curing. Homeotropic alignment is often achieved by treating a surface in a manner that encourages rod-like mesogenic molecules to align perpendicular to that surface. An ellipse (210) is used to show the orientation of the optical axis of the birefringent material.

In general, the first optical material (125) may be any optically transparent material with an optical index of refraction which matches the ordinary index of refraction of the birefringent material (205). For example, the first optical material (125) may be an isotropic material which has substantially the same index of refraction as the ordinary index of the birefringent material (205). Additionally or alternatively, the first optical material (125) may be a second birefringent material which has an ordinary index of refraction which matches the ordinary index of refraction of the first birefringent material.

The birefringent polymer elements (205) exhibit spacing (220, 225) which is repeated in one or more dimensions. This spacing may be relatively uniform over areas of the birefringent diffuser, may be a combination of two or more periodic spacings, or may have a more random distribution. As discussed above, the average pitch of the birefringent polymer elements may be within a range which is tied to the target wavelengths of light. For example, red light which has wavelength of approximately 600-750 nanometers in air may be the target waveband. If the first optical material (125) is glass with an index of refraction of approximately 1.5, then wavelength of the red light in the glass would be approximately 400 to 500 nanometers. For coupling of the guided light out of the first optical material (125), the pitches of the birefringent polymer elements can be within a range which covers the wavelength of the target light in air to the wavelength of the target light in the medium. Consequently, the desired center-to-center spacing between the birefringent elements within the first optical material (125) may be about 400 to 750 nanometers. This pitch will ensure that guided red light will tend to be scattered by the birefringent diffuser (200) at an angle that will escape beyond total internal reflection.

In some illustrative embodiments, the birefringent diffuser may be configured such that there are two or more distinct spacings or a range of spacings. This may allow the birefringent diffuser to operate over a larger range of optical wavelengths. For example, a first periodic spacing (225) may be approximately 400 to 750 nanometers and correspond to red wavelengths of light. A second periodic spacing (220) may be approximately 330 to 600 nanometers and correspond to correspond to green wavelengths of light. The second periodic spacing (220) may be intermingled with the first periodic spacing (225) to produce the desired optical diffraction. As shown above, the range of pitches in the first periodic spacing (225) and second periodic spacing (220) may overlap. However, the performance of a given diffuser can be tuned to maximize its efficiency in a target wavelength region. Where the diffuser is used as a component in a reflective display, the performance of the diffuser may be tuned to match the absorption characteristics of a pigment in the display and/or the spectral reflection of reflective elements within the display.

The second periodic spacing (225) may be created in a variety of ways, including the introduction of a second species of birefringent polymer element which has a denser packing profile. According to some illustrative embodiments, the birefringent elements may have a randomized pitch to ensure a diffuse appearance. The average pitch of the structure may be configured to be close to the wavelength of the target light in the air and/or transparent medium. Additionally or alternatively, one or more additional layers of birefringent elements may be formed. Each of the birefringent layers may be tuned to a different wavelength or range of wavelengths.

As discussed above, the birefringent polymer elements (205) have an index of refraction which varies as a function of the incidence angle of light and the polarization of the light. According to one illustrative embodiment, for light at normal incidence to the diffuser, the birefringent polymer elements (205) have an index of refraction which is the same for both polarizations of incident light and is substantially similar to the index of refraction of the first optical material (125) which may have an isotropic index of refraction. This is the ordinary index of refraction for the birefringent polymer elements (205).

For light at grazing incidence there are two possibilities: for light polarized parallel to the plane of the diffuser the index of refraction of the birefringent polymer is again the ordinary index of refraction; for light polarized normal to the plane of the diffuser the index of refraction of the birefringent polymer is different than the isotropic matrix (also known as the "extraordinary index of refraction") and produces a diffraction grating. For incident angles between normal and grazing incidence and for light polarized out of the plane of the diffuser the index of refraction varies between the ordinary and extraordinary values. In some embodiments, the extraordinary index of refraction may be higher than the ordinary index of refraction. In other embodiments the extraordinary index of refraction may be smaller than the ordinary index. While the index of refraction varies for light polarized normal to the plane of the diffuser, for light polarized parallel to the plane of the diffuser the refractive index is always the ordinary refractive index.

Figure 3A:
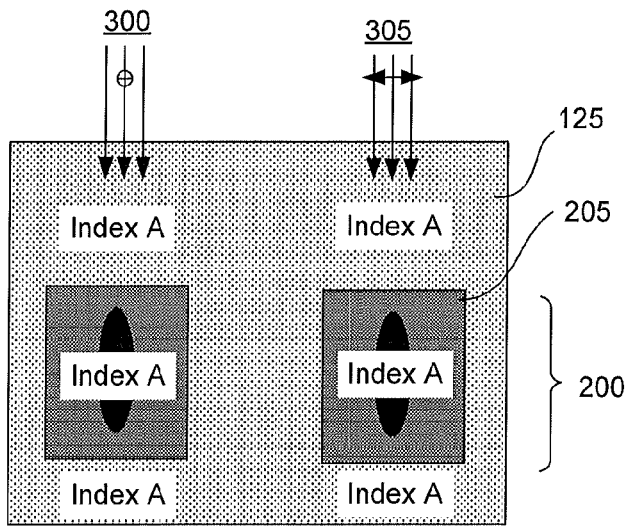
FIGS. 3A-3C are cross sectional diagrams of which show operative principles of a birefringent diffuser, according to one embodiment of principles described herein.

FIG. 3A is diagram of a small portion of an illustrative birefringent diffuser (200) which is made up of a first optical material (125) and periodically spaced birefringent polymer elements (205). Two light bundles (300, 305) are shown passing into the birefringent diffuser (200). The two light bundles (300, 305) have orthogonal polarizations which are both parallel to the plane of the diffuser (200). The polarization of the first light bundle (300) extending in and out of the page. This polarization is schematically represented by the crossed circle overlaying the first light bundle (300). A second light bundle (305) has a perpendicular polarization. This polarization vector is shown by the double headed arrow which extends horizontally across the light bundle (305).

The first and second light bundles (300, 305) are illustrated as vertically incident on the birefringent diffuser (200). According to one illustrative embodiment, the first optical material (125) has an isotropic index of refraction which has been arbitrarily designated as "Index A". Both light bundles (300, 305) enter the matrix material (125) and encounter the birefringent polymer elements (205).

As discussed above, the birefringent polymer elements (205) have anisotropic optical characteristics, including an index of refraction which may vary according to both polarization and angle of incident light. According to one illustrative embodiment, for normally incident light, the birefringent elements (205) exhibit a substantially similar index of refraction as the first optical material (125). Further, in this orientation the index of refraction of the birefringent elements (205) is uniform for any polarization of light. Consequently, both light bundles (300, 305) experience the same "Index A" or ordinary index of refraction as they pass through the birefringent diffuser (200). Because the index of refraction does not vary as the light bundles (300, 305) pass through the diffuser, the light bundles (300, 305) do not experience diffraction.

Figure 3B:
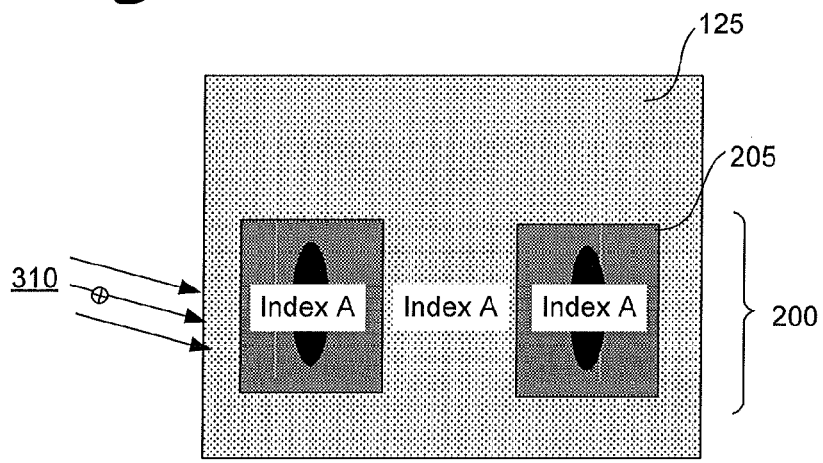

FIG. 3B is a diagram which illustrates a light beam (310) propagating at a high angle of incidence which passes into the birefringent diffuser (200). This light beam (310) represents light which has been trapped in the first optical material (125) by total internal reflection. According to one illustrative embodiment, the light beam (310) has a polarization which can be represented by a polarization vector which extends into and out of the page. This is illustrated as a crossed circle. As illustrated in FIG. 3B, this beam (310) experiences a uniform index of refraction as it passes through both the birefringent elements (205) and first optical material (125) which make up the birefringent diffuser (200). Consequently, the beam (310) does not experience substantial refractive or diffractive effects within the diffuser (200).

Figure 3C:
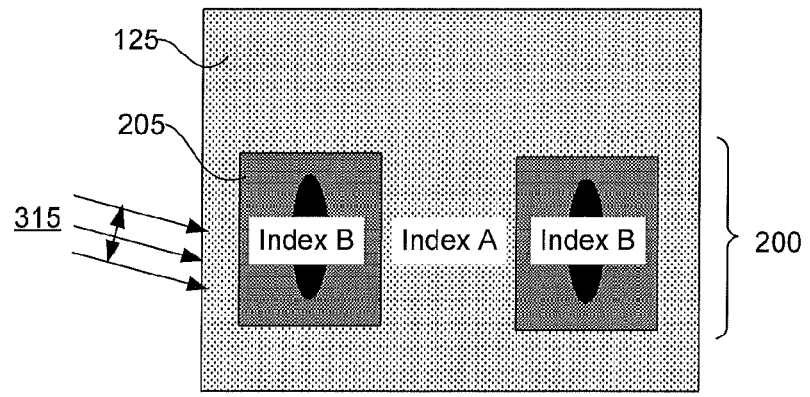

FIG. 3C is a diagram which illustrates another light beam (315) which passes into the birefringent diffuser (200). This light beam (315) also represents light which has been trapped in the first optical material (125) by total internal reflection. However, this light beam (315) is polarized as shown by the double headed arrow. In contrast to the other light beams illustrated in FIGS. 3A and 3B, light with this incidence angle and polarization is diffracted by the grating because for light propagating in this direction and with this polarization the refractive index of the grating (210) material differs from that of the surrounding medium. The birefringent polymer elements (205) have an index of refraction "Index B" which is different than the index of refraction of the first optical material (125). Consequently, light with this incidence angle and polarization will experience diffraction effects as it passes through the diffuser (200).

As illustrated in FIGS. 3A-3C incident light will experience a diffraction effect which is dependent on its incident angle and polarization. For example, light which has an incident angle and polarization which is closer to that of light beam (315) will experience more diffraction effects than light which has a more vertical incident angle.

As used in the specification and appended claims, the term "planar microstructure" refers to a planar spatial distribution of one optical material within another optical material. For at least one direction and polarization of light, the optical characteristics of the two materials are different. Additionally, the spatial distribution of the optical materials has a period which may range between approximately the optical wavelength of target light traveling in the optical materials and the optical wavelength of the target light traveling in air. For example, the "planar microstructure" may be a birefringent diffuser.

Figure 4A:
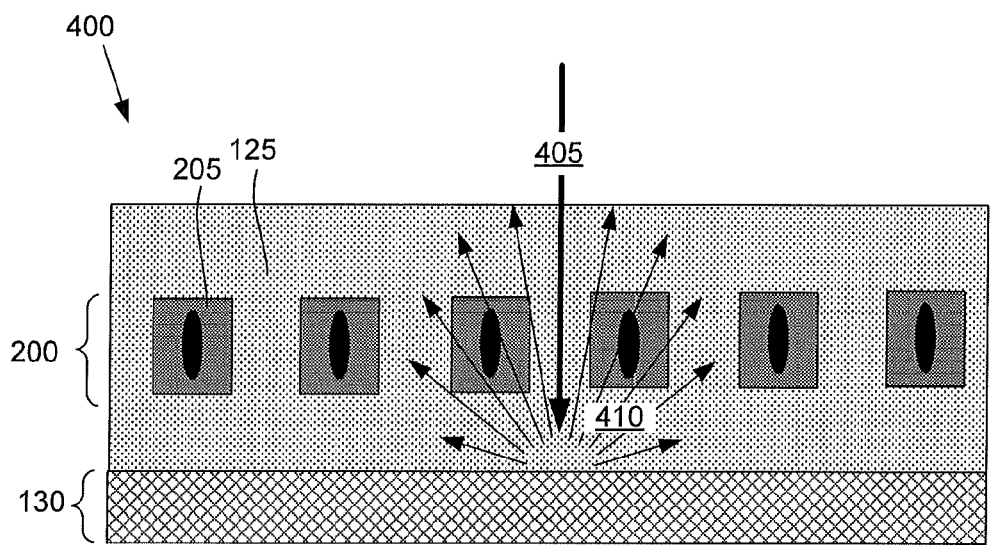
FIGS. 4A-4B are cross sectional diagrams of an illustrative birefringent diffuser which recovers a portion of the light which is trapped in a first optical material, according to one embodiment of principles described herein.
Figure 4B:
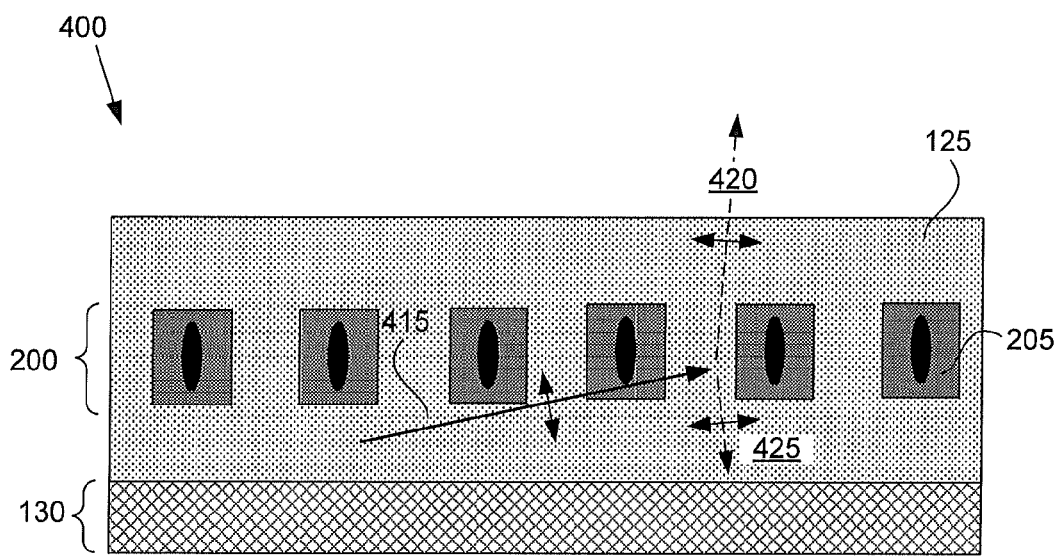

FIGS. 4A and 4B represent the birefringent diffuser (200) integrated into a simplified reflective display (400). In these figures, an underlying layer (130) represents the combined elements and functionality of a reflective display. In practice, the reflective display may comprise a number of layers, electrodes, and other elements which provide the desired functionality.

In this illustrative embodiment, the birefringent diffuser (200) is shown above the underlying layer (130). However, the birefringent diffuser (200) could be used in a variety of configurations within a reflective display. For example, birefringent diffuser (200) may be integrated into one or more layers of the reflective display.

FIG. 4A illustrates normal light ray (405) which will be polarized in a direction which is in the plane of the display. Because for light polarized in the plane of the display the birefringent elements (205) exhibit an optical index of refraction which is substantially similar to the isotropic first optical material (125), the normal light ray (405) will pass through the birefringent diffuser (200) without substantial diffraction. The normal light ray (405) then interacts with the underlying layer (130). In this illustrative embodiment, the normal light ray (405) interacts with the underlying layer to produce a diffuse reflection (410), which includes light which is trapped in the reflective display by internal reflection.

FIG. 4B illustrates a guided light ray (415) which has a relatively horizontal incident angle and has a near-vertical polarization. As discussed above, this guided light ray (415) experiences periodic variations in the index of refraction as it passes through the isotropic matrix (125) and the birefringent elements (205). According to one illustrative embodiment, diffraction grating (200) directs a portion of the guided light ray (415) upward and out of the matrix as a diffracted ray (420), which is represented by the dashed arrow. This diffracted light ray (420) is directly observable by a user of the reflective display.

The downwardly diffracted light (425) is incident on the underlying layer (130). This downwardly diffracted light (425) undergoes a diffuse reflection upon interacting with the underlying layer. As shown above with respect to FIG. 4A, the majority of the diffusely reflected light will escape the display and be observable to a user.

The amount, wavelengths, and direction of diffracted light are dependent on a number of factors. For example, the diffuser (200) may have dispersive characteristics which diffract light of different wavelengths at slightly different angles. Additionally, the diffuser may reflect light in a number of orders. In general, the diffracted light will have maxima at angles $\theta_m$ given by the equation below.

$$d \sin(\theta_m) = m\lambda \quad \text{Eq. 1}$$

where
d=the distance or period between diffractive elements
$\theta_m$=the maxima angle
m=a positive or negative integer
λ=wavelength of incident light Although the above equation only represents an idealized relationship between the various elements in a diffractive system where light is at a normal incidence to the diffuser plane, it can be useful in understanding the behavior of a diffractive diffuser. The zero order (m=0) represents light which is not diffracted. The positive first order (m=1) and negative first order (m=−1) are first order diffractions which have characteristic angles associated with various wavelengths. Other orders correspond to other positive or negative integers. Each order is associated with a characteristic angle ($\theta_m$) and quantity of diffracted light.

As can be seen from the Eq. 1, the angles of the diffracted orders are principally controlled by the period of the diffractive elements and the wavelength of the incident light. However, the distribution of energy into the various orders may be controlled by the geometry of the birefringent polymer elements. For example, the geometry of the birefringent polymer elements could be selected such that the diffracted light was directed into orders with high diffraction angles. This may create a diffuser which is more effective in directing a wide range of trapped light out of the display and toward the user. Additionally or alternatively, the geometry of the birefringent polymer elements could be selected such that the light was more uniformly dispersed through a number of orders. By more uniformly dispersing the diffracted light, the brightness of the reflective display through a range of viewing angles could be improved.

As described above, the birefringent diffuser (200) only effectively couples one polarization out of the matrix. A variety of configurations could be used couple both polarizations out of the matrix. For example, a separate microstructure layer could be created within the diffuser to couple the other polarization out of the matrix. Additionally, a number of other more complex microstructures and birefringent arrangements could out-couple both polarizations. This would result in a higher efficiency in coupling guided light out of the matrix. For example, a microstructure which couples a first polarization out of the matrix could also be configured to convert the second polarization of light into the first polarization, then couple the converted light out of the matrix. For example, a waveplate could be used to a covert the second polarization of light to the first polarization.

Figure 5:
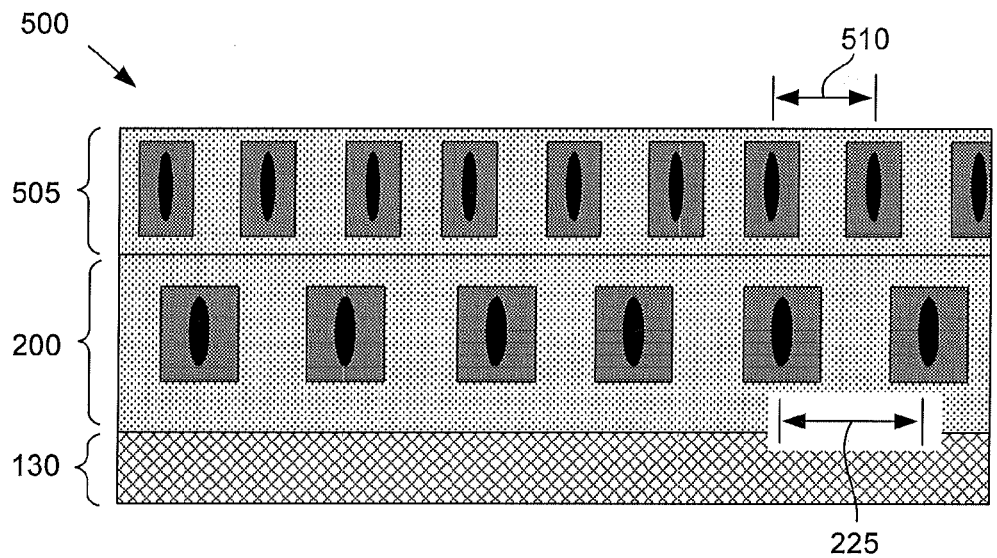
FIG. 5 is a cross sectional diagram of an illustrative display with multiple birefringent diffusers, according to one illustrative embodiment of principles described herein.

FIG. 5 is a cross sectional diagram of an illustrative display (500) which includes multiple birefringent diffusers (200, 505). In some embodiments, it may be desirable into incorporate multiple birefringent diffusers into a display. For example, when a black and white reflective display is used, it may often be illuminated by white light which is made up of a wide range of wavelengths. According to one illustrative embodiment, the multiple birefringent diffusers may be used to direct wider range of wavelengths out of the display. In a colored display, each primary color may be manipulated in a separate active layer. A birefringent diffuser may be associated with each active layer and be tuned to that particular range of wavelengths.

According to one illustrative embodiment, a first birefringent diffuser (200) may include birefringent elements (205) which have a first spacing (225). The first birefringent diffuser (200) may be tuned to diffract guided light with a first wavelength or range of wavelengths. A second birefringent diffuser (505) may have a second spacing (510) and be tuned to a second wavelength or range of wavelengths. In this way, a wider range of wavelengths can be extracted from guided modes within the display (500) and the brightness and efficiency of the display can be increased (500).

Additionally, a birefringent diffuser could be used in conjunction with a number of other approaches which reduce the amount of light trapped in the guided modes of a display. For example, the amount of trapped light can be reduced by reducing the refractive index of the display layers, depositing antireflection coatings, moth eye surfaces, or by more gradually transitioning the index of refraction on the top surface.

Figure 6:
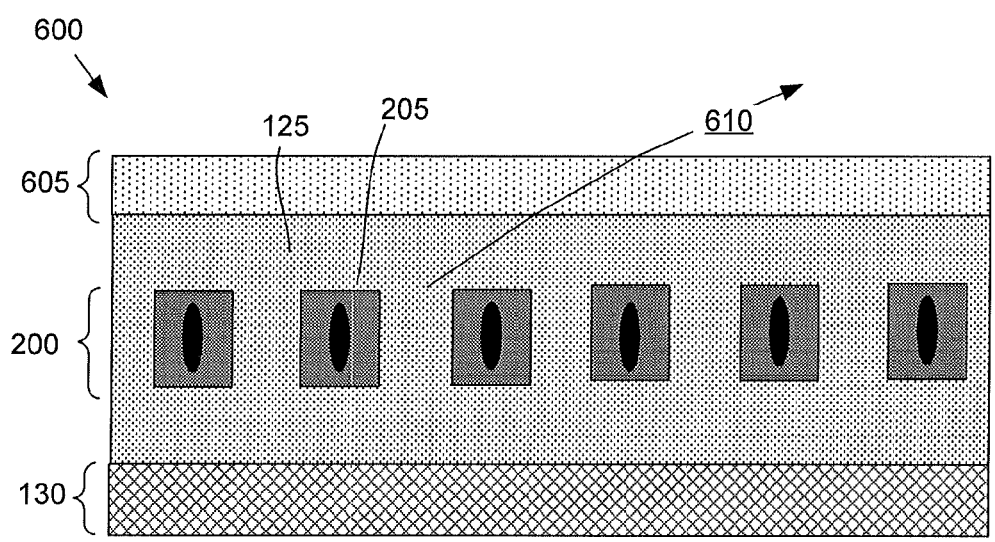
FIG. 6 is a cross sectional diagram of an illustrative display with a graded index of refraction, according to one illustrative embodiment of principles described herein.

FIG. 6 is a diagram which shows one illustrative embodiment of a reflective display (600) which incorporates a surface with an intermediate index of refraction. The typical indices for display materials such as the first optical material (125) are approximately 1.5, while the index of air is approximately 1.0. By interposing one or more transparent materials (605) with an indices between 1.5 and 1.0 between the display and the air, the change in refractive index at any boundary can be minimized. For example, some polymer materials have an index of refraction of approximately 1.3.

FIG. 6 shows a light ray (610) which would have been trapped within the first optical material (125). However, because of the addition of a transparent layer (605) which has an index which is less than the first optical material (125), but greater than index of the surrounding air, the change in refractive index at the interfaces is minimized and the light (610) is able to escape. In general, minimizing the change index of refraction across interfaces reduces the reflections those interfaces.

Figure 7:
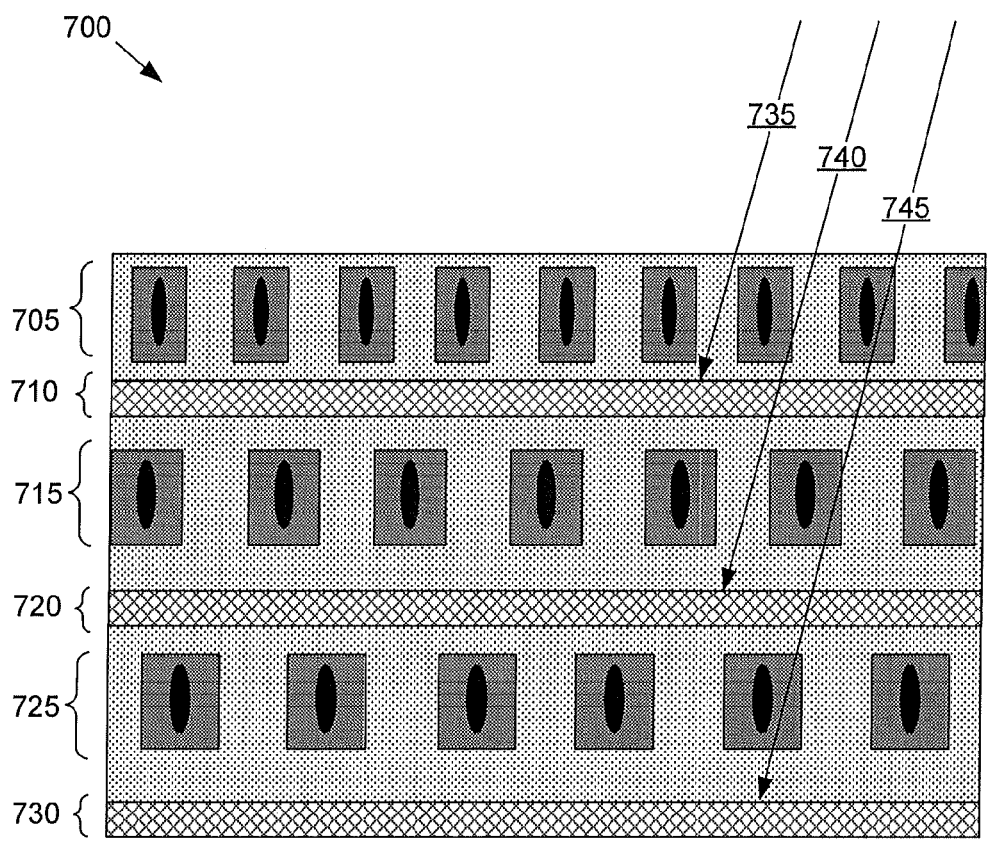
FIG. 7 is a cross sectional diagram of an illustrative color display with multiple birefringent diffusers, according to one illustrative embodiment of principles described herein.

FIG. 7 is a cross-sectional diagram of a color display (700) which incorporates a number of active layers (710, 720, 730). According to one illustrative embodiment, each of the active layers may manipulate a specific band of light. For example, a first active layer (710) may be configured to manipulate short wavelengths of light (735) such as violet and blue. A first birefringent diffuser (705) deposited over the first active layer (710) and is tuned to extract violet and blue light from guided modes within the display. Similarly, a second active layer (720) may be configured to manipulate intermediate wavelengths of light (740) such as green light. A second birefringent diffuser (715) is tuned the green wavelengths of light. The third active layer (730) may be configured to manipulate long wavelengths of light (745) such as red. A third birefringent diffuser (725) is tuned to diffract red wavelengths of light from guided modes.

FIG. 7 is only one illustrative embodiment of a color display. A variety of other configurations could be used. By way of example and not limitation, the active layers (710, 720, 730) could all be adjacent, with one or more diffractive diffusers (705, 715, 725) disposed above the adjacent active layers (710, 720, 730). In another embodiment, the order of the layers may be interchanged, with layers (725, 730) associated with the longer and lower energy wavelengths on top, with shorter wavelength layers (705, 710) at the bottom of the display.

Additionally or alternatively, the top surface of the display may be structured with an array of microlens structures to couple out some of the guided light. However, these structures may also couple some of the incident light into guided modes, and also tend to back-scatter light. This can reduce the contrast of the display. Other possibilities include using a photonic bandgap structure to reduce the propagation of waveguide modes in the first place. The photonic bandgap structure may have a periodicity on the order of the target wavelengths and a large refractive index difference between the bandgap layers.

Although the birefringent diffusers have been described in the context of reflective display, they could also be used to improve the out-coupling of light from luminescent layers. The scattering would help to outcouple light trapped in waveguide modes, while reducing the coupling in of incident ambient light.

The figures above describe separate birefringent elements which are organized within an isotropic matrix. A variety of other structures could be used to form a birefringent diffuser which is suitable for directing trapped light out of guided modes.

Figure 8:
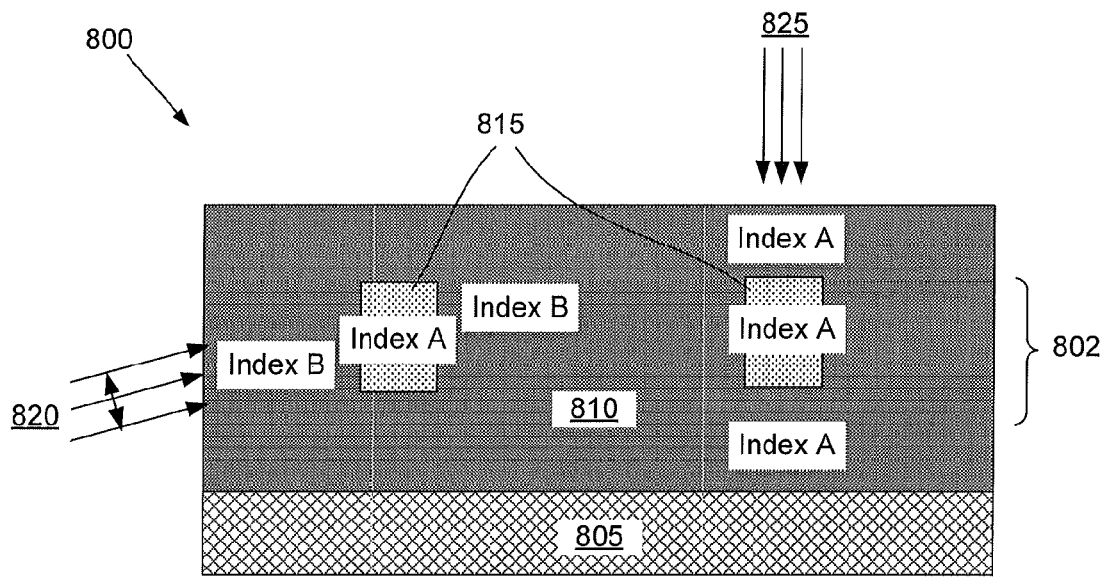
FIG. 8 is a cross sectional diagram of an illustrative display with a birefringent diffuser, according to one illustrative embodiment of principles described herein.

FIG. 8 is a cross sectional diagram of an illustrative display (800) with a birefringent diffuser (802) which is formed on substrate (805). The birefringent diffuser is made up of a continuous layer of birefringent material (810) with imbedded isotropic elements (815). Although this is the opposite of previously described embodiments, the principles of operation are the same. The birefringent layer (810) has an index of refraction which matches the index of refraction of the isotropic elements (815) for light with a normal incidence (825). However, for guided light (820) with a particular polarization, the index varies and creates a diffuser which directs that polarization of light out of the display (800).

Figure 9:
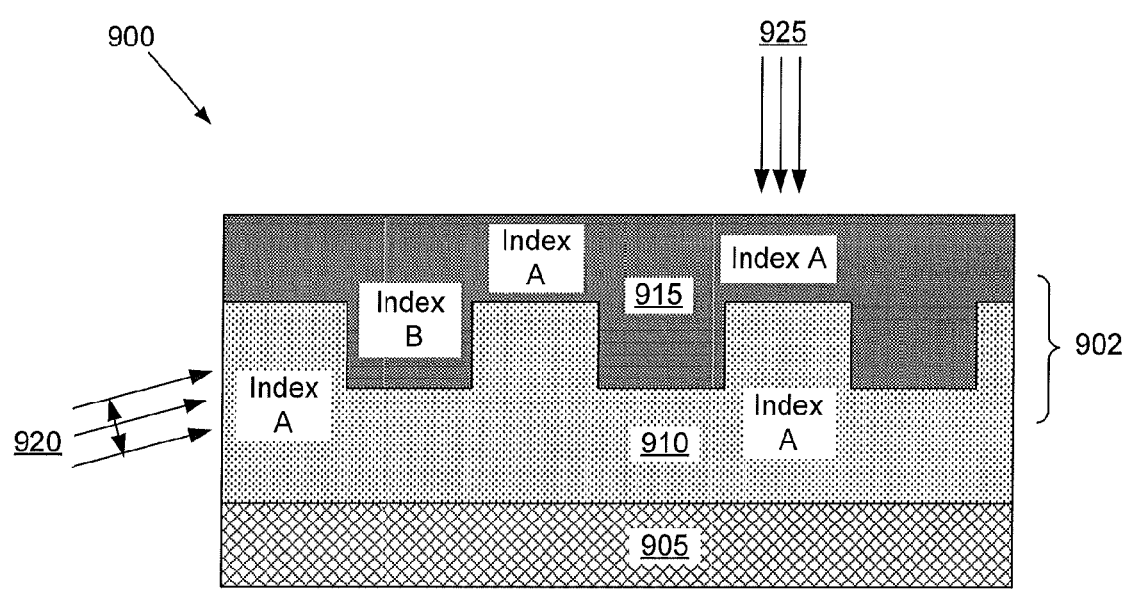
FIG. 9 is a cross sectional diagram of an illustrative display with a birefringent diffuser, according to one illustrative embodiment of principles described herein.

FIG. 9 is a cross sectional diagram of an illustrative display (900) with a birefringent diffuser (902). In this illustrative embodiment, separate elements are not used. Instead, the birefringent diffuser (902) is a continuous layer of birefringent material (915) whose thickness is periodically modulated. This modulation of the thickness of the birefringent material (915) could be created in a number of ways. For example, an isotropic layer (910) may be deposited on a substrate (905). In this embodiment, the isotropic layer (910) has an index A for light of all incidence angles and polarizations. The isotropic layer (910) is patterned so that its surface has a series of indentations. The birefringent material is deposited on top of the isotropic layer (910) and fills the indentations. This creates a birefringent layer (915) which has a modulated thickness.

The birefringent layer (915) has an index of refraction which matches the index of refraction of the isotropic layer (910) for light with a normal incidence (925). Consequently, light with a substantially normal incidence is not diffracted. However for guided light (920) with a particular polarization, the index varies and creates a diffuser which directs that polarization of light out of the display (900).

In an alternative embodiment, a patterned birefringent layer may be deposited directly on the substrate. An isotropic layer may then be deposited over the patterned birefringent layer. In yet another alternative embodiment, two birefringent materials could be used to form the diffuser. The two birefringent materials have matched indices for normal light but mismatched indices for trapped light. For example, the two birefringent materials may have the same ordinary index of refraction but differing extraordinary indices of refraction. These two birefringent materials could be arranged is a variety of ways to create the birefringent diffuser. Illustrative examples of these arrangements are given in FIGS. 4A, 4B, 5, 6, 7, 8 and 9 where the second birefringent material is properly oriented and takes the place of the isotropic first optical material.

In another illustrative embodiment, the three or more birefringent materials could be used which have matching ordinary indices of refraction and are oriented such that normal light does not see a change index as it passes through the diffuser. The three or more birefringent materials are combined to produce a grating effect for guided or off axis light. For example, the diffuser may have stepped, blazed, or asymmetric grating profiles.

In general, the diffuser could be made up of one or more birefringent materials which with matched ordinary indices and with their vertical optical axes aligned. In some embodiments, an isotropic material could be used which has an index of refraction which substantially matches the ordinary index of refraction of the birefringent material(s). The birefringent material(s) may have a range of extraordinary indices.

As discussed above, a variety of spacing between the patterned elements could be used to achieve the desired optical properties. The spacing could be periodic, vary in one or more dimensions, contain two or more periodic spacings, or have random elements within the pattern.

Figure 10:
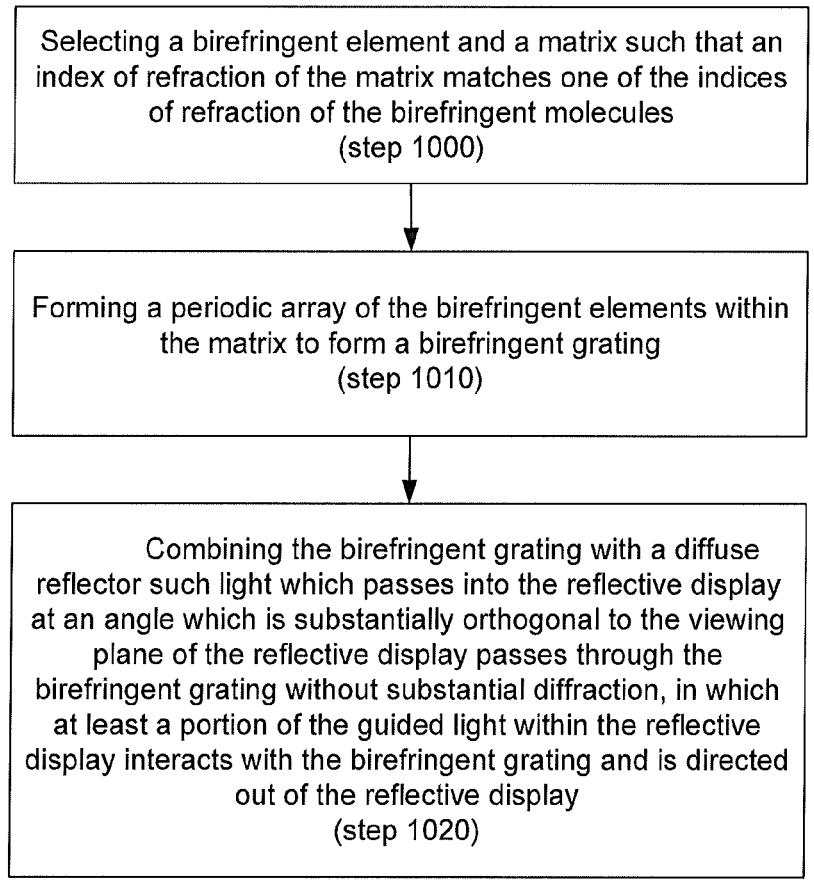
FIG. 10 is a flowchart of an illustrative method for extracting light from a reflective display, according to one illustrative embodiment of principles described herein.

FIG. 10 is a flowchart which shows one illustrative method for manufacturing a reflective display. According to one illustrative embodiment, a first step includes selecting a birefringent material and a matrix such that an index of refraction of the matrix matches one of the indices of refraction of the birefringent material (step 1000). Next, an array of birefringent elements is formed from the birefringent material within the matrix to create a birefringent diffuser (step 1010). To produce the desired optical behavior, the array may be periodic, pseudo-periodic, or may be randomized. For example, in some embodiments, birefringent elements may self-organize into a periodic hexagonal packing order. In other embodiments, it may be desirable to have a more random grating structure to broaden the band width of light which is influenced by the grating.

The birefringent diffuser is combined with a diffuse reflector such that light which passes into the reflective display at an angle which is substantially orthogonal to the viewing plane of the reflective display passes through the birefringent diffuser without substantial diffraction and at least a portion of the guided light within the reflective display interacts with the birefringent diffuser and is directed out of the reflective display (step 1020).

According to one illustrative embodiment, the birefringent elements are formed from reactive mesogenic materials, also known as curable liquid crystals. The birefringent diffuser may be formed in at least three ways. In a first method, the reactive mesogenic material is deposited on a surface and patterned, such as by printing, imprinting or etching. In a second method, the reactive mesogenic material may be deposited onto a surface previously patterned with features. In either case, the result is an array of elements or a film of varying thickness which forms a birefringent grating.

In a third method, reactive mesogenic materials can be allowed to self organize into a uniformly aligned birefringent state. This may be accomplished by suspending the mesogenic materials in a solvent and then allowing the solvent to evaporate. Additionally or alternatively, the reactive mesogenic materials can be allowed to self-organize by thermally annealing the mesogenic material into an isotropic state and allowing it to cool back into a crystalline state. The desired uniform alignment may be seeded by suitable treatment of the surface on which the material is deposited. For example, a substrate may be prepared by rubbing or by treating with a homeotropic alignment agent. The mesogenic materials are then deposited onto the substrate and allowed to self organize into a birefringent diffuser. The birefringent diffuser is then cured into a solid layer which fixes its structure. This layer of birefringent elements, or birefringent film of modulated thickness, may then be coated with a layer of isotropic polymer to complete and planarize the diffuser.

As discussed above, it may be desirable into incorporate multiple birefringent diffusers into a display. Where multiple birefringent diffusers are used, the method may further include forming a first birefringent diffuser with a first spacing between birefringent elements which is configured to diffract a first wavelength of light; and forming a second birefringent diffuser with a second spacing between birefringent elements, the second birefringent diffuser being configured to diffract a second wavelength of light.

In sum, light at normal incidence to a birefringent diffuser sees no modulation in refractive index and so is not scattered into guided modes. However, some of the guided light propagating within the layer will experience a modulated refractive index. As a result, it will then be scattered out of the layer. This asymmetry in the coupling between guided modes and incident light results in a net increase in brightness.

This structure could be manufactured using roll-to-roll processing on plastic substrates and could be integrated within display systems. It is particularly suited to multilayer reflective displays, where each layer is tuned to modulate a separate color. The pitch of the birefringent structure can be tuned to match the color modulated in each layer. The structure could also find applications in luminescent or emissive displays where it is also important to restrict the amount of light trapped in guided modes.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A birefringent diffuser comprising:
a first optical material; and
a first birefringent material, the first optical material and the first birefringent material being combined to form a planar layer, the planar layer having an internal pattern of said materials presenting a substantially uniform index of refraction for incident light which is substantially normal to the planar layer and exhibiting a varying index of refraction for at least a portion of guided light which is trapped in guided modes such that at least a portion of the guided light is able to escape beyond total internal reflection.

2. The diffuser claim 1, in which the first optical material is an optically isotropic material.

3. The diffuser of claim 1, in which the first optical material is a second birefringent material.

4. The diffuser of claim 1, in which a planar microstructure of the first birefringent material is disposed within a matrix of the first optical material such that a portion of the guided light within the matrix of the first optical material is coupled out of the first optical material by interacting with the planar microstructure and normally incident light which enters the first optical material is not substantially coupled into guided modes by the planar microstructure.

5. The diffuser of claim 1, in which a planar microstructure of first optical material is disposed within a matrix of the first birefringent material.

6. The diffuser of claim 1, further comprising a substrate wherein a patterned layer of the first optical material being deposited on the substrate, the first birefringent material being deposited over the patterned layer of the first optical material to form a birefringent layer with varying thickness.

7. The diffuser of claim 1, in which an ordinary optical axis of the first birefringent material is aligned substantially normal to a plane of the birefringent diffuser.

8. The diffuser of claim 1, in which the first birefringent material comprises an ordered polymer material.

9. The diffuser of claim 1, in which the first birefringent material exhibits an optical index of refraction which is substantially similar to the optical index of refraction of the first optical material for light which is polarized in a plane of the birefringent diffuser.

10. The diffuser of claim 1, in which the first birefringent material exhibits an optical index of refraction which is different from the optical index of refraction of the first optical material for at least one polarization of light in guided modes within the birefringent diffuser.

11. The diffuser of claim 1, in which the first birefringent material is formed into a continuous layer with a periodic pattern of varying thickness.

12. The diffuser according of claim 1, in which a spacing of the pattern of features in the birefringent diffuser is tuned to a first range of wavelengths to maximize efficiency of the diffuser of those wavelengths; further comprising a second birefringent diffuser with pattern of features with a second spacing which is tuned to a second and different range of wavelengths.

13. The diffuser of claim 1, further comprising an active display layer, the birefringent diffuser adjacent to the active display layer and increasing the perceived brightness of the active display layer by directing the guided light within the active display layer and the birefringent diffuser out of the birefringent diffuser to an observer.

14. A reflective display comprising:
a diffuse reflector; and
a birefringent diffuser, the birefringent diffuser allowing light which passes into the reflective display at a substantially normal angle to the reflective display to pass through the birefringent diffuser without substantial diffraction and strike the diffuse reflector, in which at least a portion of guided light within the reflective display interacts with the birefringent diffuser and is diffracted out of the reflective display.

15. The reflective display of claim 14, in which the birefringent diffuser comprises:
a first optical material; and
a first birefringent material the first optical material and the first birefringent material being combined to form a planar layer, the planar layer having an internal pattern of said materials presenting a substantially uniform index of refraction for incident light which is substantially normal to the planar layer and exhibiting a varying index of refraction for at least a portion of light which is trapped in guided modes.

16. The reflective display of claim 15, in which the first birefringent material exhibits an optical index of refraction which is different than the first optical material for at least one polarization of light in guided modes within the birefringent diffuser.

17. The reflective display of claim 15, in which a planar microstructure of the first birefringent material is disposed within a matrix of the first optical material-such that:
   a portion of guided light within the matrix of the first optical material is coupled out of the first optical material by interacting with the planar microstructure; and
   normally incident light which enters the first optical material is not substantially coupled into guided modes by the planar microstructure.

18. A reflective display, comprising:
   a diffuse reflector;
   a birefringent diffuser, the birefringent diffuser comprising:
      a first optical material; and
      a first birefringent material;
      in which the first optical material and the first birefringent material are combined to form a planar layer and which the planar layer has an internal pattern of said first optical material and first birefringent material that present a substantially uniform index of refraction for incident light which is substantially normal to the planar layer and exhibits a varying index of refraction for at least a portion of light which is trapped in guided modes; and
   a second optical material interposed between air and the combined second optical material and the first birefringent material;
   in which the first optical material minimizes a change in the refractive index at the boundary of the combined second optical material and the first birefringent material.

19. The reflective display of claim 18, in which a planar microstructure of the first birefringent material is disposed within a matrix of the first optical material-such that:
   a portion of guided light within the matrix of the first optical material is coupled out of the first optical material by interacting with the planar microstructure; and
   normally incident light which enters the first optical material is not substantially coupled into guided modes by the planar microstructure.

20. The reflective display of claim 18, in which an ordinary optical axis of the first birefringent material is aligned substantially normal to the plane of the birefringent diffuser.

* * * * *

UNITED STATES PATENT AND TRADEMARK OFFICE
CERTIFICATE OF CORRECTION

PATENT NO. : 8,817,374 B2
APPLICATION NO. : 13/387153
DATED : August 26, 2014
INVENTOR(S) : Stephen Kitson et al.

Page 1 of 1

It is certified that error appears in the above-identified patent and that said Letters Patent is hereby corrected as shown below:

In the Claims

In column 11, line 61, in Claim 2, delete "claim" and insert -- of claim --, therefor.

In column 12, line 9, in Claim 6, delete "1 ," and insert -- 1, --, therefor.

In column 12, line 32, in Claim 12, after "diffuser" delete "according".

In column 12, line 35, in Claim 12, delete "of" and insert -- for --, therefor.

In column 12, line 58, in Claim 15, delete "material the" and insert -- material, the --, therefor.

Signed and Sealed this
Twenty-seventh Day of January, 2015

Michelle K. Lee
*Deputy Director of the United States Patent and Trademark Office*